United States Patent
Lee et al.

(10) Patent No.: US 7,047,535 B2
(45) Date of Patent: May 16, 2006

(54) METHOD, SYSTEM, AND PROGRAM FOR PERFORMING WORKFLOW RELATED OPERATIONS USING AN APPLICATION PROGRAMMING INTERFACE

(75) Inventors: Taejae Lee, Cupertino, CA (US); Jy-Jine James Lin, Cupertino, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 09/918,143

(22) Filed: Jul. 30, 2001

(65) Prior Publication Data
US 2003/0023773 A1    Jan. 30, 2003

(51) Int. Cl.
*G06F 9/00* (2006.01)
(52) U.S. Cl. ............................... 719/328; 707/3; 705/1
(58) Field of Classification Search .............. 705/1–11; 707/1–10, 101–103 X; 709/200–253; 719/328–332
See application file for complete search history.

(56) References Cited

U.S. PATENT DOCUMENTS

| | | | |
|---|---|---|---|
| 5,301,320 A | 4/1994 | McAtee et al. | |
| 5,535,322 A | 7/1996 | Hecht | |
| 5,572,673 A | 11/1996 | Shurts | |
| 5,596,744 A | 1/1997 | Dao et al. | |
| 5,596,750 A | 1/1997 | Li et al. | |
| 5,634,053 A | 5/1997 | Noble et al. | |
| 5,634,127 A | 5/1997 | Cloud et al. | |
| 5,644,768 A * | 7/1997 | Periwal et al. ............. 718/102 | |
| 5,721,912 A | 2/1998 | Stepczyk et al. | |
| 5,721,913 A | 2/1998 | Ackroff et al. | |
| 5,734,837 A | 3/1998 | Flores et al. | |
| 5,745,683 A | 4/1998 | Lee et al. | |
| 5,745,687 A | 4/1998 | Randell | |
| 5,752,027 A | 5/1998 | Familiar | |
| 5,774,661 A | 6/1998 | Chatterjee et al. | |
| 5,790,789 A | 8/1998 | Suarez | |
| 5,794,250 A | 8/1998 | Cariño, Jr. et al. | |
| 5,826,086 A | 10/1998 | Arima et al. | |
| 5,826,239 A | 10/1998 | Du et al. | |
| 5,860,066 A | 1/1999 | Rouse | |
| 5,864,843 A | 1/1999 | Cariño, Jr. et al. | |

(Continued)

FOREIGN PATENT DOCUMENTS

JP    10-081425    3/1998

(Continued)

OTHER PUBLICATIONS

U.S. Appl. No. 09/918,185, filed on Jul. 30, 2001, entitled, "Method, System, and Program for Enabling Access to a Plurality of Services", invented by AT Yaung.

(Continued)

*Primary Examiner*—William Thomson
*Assistant Examiner*—Charles Anya
(74) *Attorney, Agent, or Firm*—David W. Victor; Konrad Raynes & Victor, LLP

(57) ABSTRACT

Provided is a method, system, and program for performing workflow related operations. An application programming interface call (API) is received to perform a workflow related operation. A determination is made of at least one stored procedure call associated with the received API. The determined at least one stored procedure is then called to cause the execution of one determined stored procedure on a database server to perform the workflow related operation of the API.

44 Claims, 7 Drawing Sheets

U.S. PATENT DOCUMENTS

| | | | |
|---|---|---|---|
| 5,873,083 | A | 2/1999 | Jones et al. |
| 5,892,905 | A | 4/1999 | Brandt et al. |
| 5,913,214 | A | 6/1999 | Madnick et al. |
| 5,926,636 | A | 7/1999 | Lam et al. |
| 5,930,512 | A | 7/1999 | Boden et al. |
| 5,937,388 | A | 8/1999 | Davis et al. |
| 5,951,649 | A | 9/1999 | Dobbins et al. |
| 5,960,420 | A | 9/1999 | Leymann et al. |
| 5,987,422 | A * | 11/1999 | Buzsaki .......................... 705/9 |
| 5,991,733 | A | 11/1999 | Aleia et al. |
| 6,006,193 | A | 12/1999 | Gibson et al. |
| 6,012,067 | A | 1/2000 | Sarkar |
| 6,044,378 | A | 3/2000 | Gladney |
| 6,061,667 | A | 5/2000 | Danford-Klein et al. |
| 6,065,009 | A | 5/2000 | Leymann et al. |
| 6,073,109 | A | 6/2000 | Flores et al. |
| 6,073,111 | A | 6/2000 | Leymann et al. |
| 6,115,646 | A | 9/2000 | Fiszman et al. |
| 6,151,583 | A | 11/2000 | Ohmura et al. |
| 6,170,002 | B1 | 1/2001 | Ouchi |
| 6,226,641 | B1 | 5/2001 | Hickson et al. |
| 6,278,977 | B1 | 8/2001 | Agrawal et al. |
| 6,308,163 | B1 | 10/2001 | Du et al. |
| 6,338,074 | B1 | 1/2002 | Poindexter et al. |
| 6,349,238 | B1 | 2/2002 | Gabbita et al. |
| 6,430,538 | B1 | 8/2002 | Bacon et al. |
| 6,453,320 | B1 | 9/2002 | Kukura et al. |
| 6,487,607 | B1 | 11/2002 | Wollrath et al. |
| 6,578,006 | B1 | 6/2003 | Saito et al. |
| 6,606,740 | B1 | 8/2003 | Lynn et al. |
| 6,665,674 | B1 | 12/2003 | Buchanan et al. |
| 6,665,814 | B1 | 12/2003 | Hobson et al. |
| 6,681,243 | B1 | 1/2004 | Putzolu et al. |
| 6,691,299 | B1 | 2/2004 | Hart et al. |
| 6,721,713 | B1 | 4/2004 | Guheen et al. |
| 6,769,113 | B1 | 7/2004 | Bloom et al. |
| 6,769,124 | B1 | 7/2004 | Schoening et al. |
| 6,816,902 | B1 | 11/2004 | Bandat et al. |
| 6,853,974 | B1 | 2/2005 | Akifuji et al. |
| 6,877,153 | B1 | 4/2005 | Konnersman |
| 2002/0032783 | A1 | 3/2002 | Tuatini |
| 2002/0038357 | A1 | 3/2002 | Haverstock et al. |
| 2002/0040312 | A1 | 4/2002 | Dhar et al. |
| 2002/0059411 | A1 | 5/2002 | Barnhouse et al. |
| 2002/0103811 | A1 | 8/2002 | Fankhauser et al. |
| 2002/0120685 | A1 | 8/2002 | Srivastava et al. |
| 2002/0143949 | A1 | 10/2002 | Rajarajan et al. |
| 2003/0023728 | A1 | 1/2003 | Yaung |
| 2003/0033415 | A1 | 2/2003 | Graylin et al. |
| 2003/0131075 | A1 | 7/2003 | Bear et al. |
| 2004/0015821 | A1 | 1/2004 | Lu et al. |

FOREIGN PATENT DOCUMENTS

| | | |
|---|---|---|
| JP | 10-326314 | 12/1998 |
| JP | 11-003298 | 1/1999 |
| JP | 11-175644 | 7/1999 |
| JP | 11-249983 | 9/1999 |

OTHER PUBLICATIONS

U.S. Appl. No. 09/894,074, filed on Jun. 28, 2001, entitled, "Method, System, and Program for Generating a Workflow", invented by WF Miller and AT Yaung.

U.S. Appl. No. 09/894,413, filed on Jun. 28, 2001, entitled, "Method, System, and Program for Using Objects in Data Stores During Execution of a Workflow", invented by JJ Lin; WF Miller; AT Yaung.

U.S. Appl. No. 09/918,204, filed Jul. 30, 2001, entitled, "Method, System, and Program for Transferring Data From an Application Engine", invented by T. Lee and AT Yaung.

U.S. Appl. No. 09/918,144, filed on Jul. 30, 2001, entitled, "Method, System, and Program for Maintaining Information in Database Tables and Performing Operations on Data in the Database Tables", invented by T. Lee; JJ Lin; and AT Yaung.

U.S. Appl. No. 09/894,076, filed on Jun. 28, 2001, entitled, "Method, System, and Program for Executing a Workflow", invented by AT Yaung.

Galtzur, Z. et al. "Managing Workflow Using Database Techniques", IBM Technical Disclosure Bulletin, vol. 39, No. 08, Aug. 1996, pp. 199-201.

Yong, Y.M. "Template-Driven Document-Exchange Specification", IBM Technical Disclosure Bulletin, vol. 39, No. 11, Nov. 1996, pp. 173-178.

Duscher, R. et al. "Audit Trail Support For Program Activity Implementations of Workflow Management Systems", 1994, pp. 1-4.

Dr. Leymann, F. et al. "Context Support For Program Activity Implementations of Workflow Management Systems", 1994, pp. 1-4.

Sluiman, H. "A Relational Schema to Support Task and Workflow, Data Collection and Analysis", pp. 1-3.

IBM Corp. "Chapter 4. Introducing Enterprise Information Portal Workflow" from *Managing Enterprise Information Portal*, IBM Enterprise Information Portal for Multiplatforms, Version 7.1, #SC27-0875-00, Product Nos. 5697-G29 and 5697-G31, Aug. 2000, pp. iii-iv and pp. 39-45.

IBM, Corp. "Concepts and Architecture" IBM MQSeries Workflow, Version 3.3, #GH12-6285-03, Product No. 5697-FM3, Mar. 2001, pp. iii-58.

IBM, Corp. "User's Guide for the Work Management Builder" IBM ImagePlus Workfolder Application Facility for AS/400, Version 4 Release 1, #SC34-4587-00, Program No. 5733-A18, Sep. 1997, pp. iii-119.

Su, SYW et al. "An Extensible Knowledge Base Management System for Supporting Rule-based interoperability among Heterogeneous Systems" 1995, ACM # 0-89791-812-06/95/11, pp. 1-10.

Johansson, SE et al. "Expert Workflow, Building Knowledge-Based Workflow Systems with Object Technology", 1997, pp. 45-49.

Leymann, F. et al. "Workflow-based Applications" [online], vol. 36, No. 1—Application Development, pp. 1-22, plus 9 pages of linked Figures (drawings), and 2 pages of "Cited References and Notes". [Retrieved on May 17, 2001]. Retrieved from the Internet at <URL: http://www.research.ibm.com/journal/sj/361/leymann.html>.

Vossen, G. "The WASA2 Object-Oriented Workflow Management System", 1999, ACM # 1-58113-084-8/99/05, pp. 587-589.

Choudhary, G.S., C. Requardt, I. Fujinaga, T. DiLauro, E.W. Brown, J.W. Warner, and B. Harrington, "Digital Workflow Management: The Lester S. Levy Digitized Collection of Sheet Music", [online], © 2000 *First Monday*, [Retrieved on Mar. 17, 2005], retrieved from the Internet at <URL: //firstmonday.org/issues/issue5_6/choudhury/index.html>.

Gulcu, C. (Ed.), "Suitable Interface Adaptor (Workflow Module)", *Cross-Organisational Workflow: CrossFlow*, ESPRIT E/28635, Dec. 1999, pp. 1-12.

Hudgins, J. and L.A. Macklin, "New Materials, New Processes: Implementing Digital Imaging Projects into Existing Workflow", *Library Collections, Acquisitions, & Technical Services*, 2000, No. 24, pp. 189-204.

IBM Corporation, "Method for Testing Program Activity Implementations of Workflow Management Systems", *IBM Research Disclosure*, No. 408186, Apr. 1998, pp. 503-505.

IBM Corporation, "Non-Destructive Annotation of Documents in an Image Processing Enviroment", *IBM Research Disclosure*, No. 430191, Feb. 2000, pp. 404-408.

IBM Corporation, "Runtime Transaction Management in a Transaction Service", *IBM Research Disclosure*, No. 416150, Dec. 1998, pp. 1720-1721.

Mohan, C., "Workflow Management in the Internet Age", *Proceedings of the Second East European Symposium on Advances in Databases and Information Systems*, 1998, pp. 26-34.

Nyberg, K., "Workflow Definition Languages", [online], Nov. 21, 2000, retrieved from the Internet at <URL:www.cs.hut.fi/~kny/workflowlang/>.

Reinwald, B., "Structured Workflow Management with Lotus Notes Release 4", *Proceedings of the 41st IEEE Computer Society International Conference (CompCon)*, Feb. 1996, pp. 451-457.

Spitzer, T., "Forms, Workflow, and the Web", [online], [Retrieved on Mar. 17, 2005], retrieved from the Internet at <URL: w.webtechniques.com/archives/1999/10/busi/>.

Trammell, K., "Work Flow Without Fear", *Byte.com*, [online], Sep. 6, 2004, retrieved from the Internet at <URL: w.byte.com/art/9604/sec8/art1.htm>.

* cited by examiner

METHOD, SYSTEM, AND PROGRAM FOR PERFORMING WORKFLOW RELATED OPERATIONS USING AN APPLICATION PROGRAMMING INTERFACE

RELATED APPLICATIONS

This application is related to the following copending and commonly assigned patent applications, which are incorporated herein by reference in their entirety:

"Method, System, and Program for Generating a Workflow", having application Ser. No. 09/894,074, and filed on Jun. 28, 2001;

"Method, System, and Program for Using Objects In Data Stores During Execution of a Workflow", having application Ser. No. 09/894,413, and filed on Jun. 28, 2001;

"Method, System, and Program for Executing a Workflow", having application Ser. No. 09/894,076, and filed on Jun. 28, 2001;

"Method, System, and Program for Maintaining Information in Database Tables and Performing Operations on Data in the Database Tables", having application Ser. No. 09/09918144, and filed on the same date hereof.

BACKGROUND OF THE INVENTION

1. Field of the Invention

The present invention relates to a method, system, and program for performing workflow related operations.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines Corporation (IBM) MQSeries** Workflow software product. A process modeler is a person that analyzes the business operations, determines how the information related to the operations is routed electronically to client computers, and then defines a workflow model of the operations. The workflow model may be coded in the FlowMark Definition Language (FDL). The workflow model is then imported into a Runtime program that verifies and translates the workflow model into a process template. An instance of the process template can then be invoked to automates the sequence of events defined by the model.

**MQSeries, IBM, and DB2 are registered trademarks of International Business Machines Corp.; Microsoft and Microsoft SQL Server are trademarks of Microsoft Corporation; ORACLE is a trademark of the Oracle Corporation; Java is a trademark of Sun Microsystems, Inc.

Current workflow programs provide an application program interface (API) for client applications to use to interact with the workflow engine and perform workflow related functions and operations. In prior art implementations where the API is implemented in Java**, a Java Native Interface (JNI) wrapper is provided to translate the Java APIs to the native code of the workflow engine. The workflow engine then executes the native code to perform the function specified by the API. In addition, a database is usually provided to store workflow related information and metadata. Java APIs are also provided to access workflow metadata in the workflow database. Thus, the client program would issue Java APIs to interact with the workflow engine and separately call other APIs to interact with the workflow database to access and manipulate workflow metadata.

**MQSeries, IBM, and DB2 are registered trademarks of International Business Machines Corp.; Microsoft and Microsoft SQL Server are trademarks of Microsoft Corporation; ORACLE is a trademark of the Oracle Corporation; Java is a trademark of Sun Microsystems, Inc.

The programming of the JNI interface are very difficult and cumbersome to code and debug. Further, the JNI interface developed for one vendor workflow engine is not reusable because it is closely coupled with the specific workflow engine implementation and cannot be reused with other vendor workflow engine implementations. In fact, the software developer would have to recompile every JNI interface based on the compiler and client/server architecture used for different vendor workflow engines.

For these reasons, there is a need in the art to provide improved designs of workflow programs.

SUMMARY OF THE PREFERRED EMBODIMENTS

Provided is a method, system, and program for performing workflow related operations. An application programming interface (API) call is received to perform a workflow related operation. A determination is made of at least one stored procedure call associated with the received API. The determined at least one stored procedure is then called to cause the execution of one determined stored procedure on a database server to perform the workflow related operation of an API of the API call.

In further implementations, at least one stored procedure call invokes one stored procedure in the database server that includes native workflow server code to communicate to a workflow server to execute to perform the workflow related operation of the API and at least one stored procedure call invokes one stored procedure in the database server that includes database statements executed by a database program to access workflow related metadata for the API.

Further provided is a method, system, and program for performing workflow related operations at a database server in communication with a client. At least one call to one stored procedure is received at the database server associated with an application programming interface (API) call invoked from the client to perform a workflow related operation. The database server executes the at least one called stored procedure to perform the workflow related operation of an API of the API call.

In still further implementations, at least one call to one stored procedure comprises a first and second stored procedure calls to first and second stored procedures, respectively, on the database server to implement the workflow related operation of the called API.

The described implementations provide a workflow design in a client/server environment that utilizes stored procedures on a database server to perform the workflow related operations associated with a workflow related API. The stored procedures may include native workflow server code to send to the workflow server to perform the workflow related operations specified by the API and/or access workflow metadata in a workflow database.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
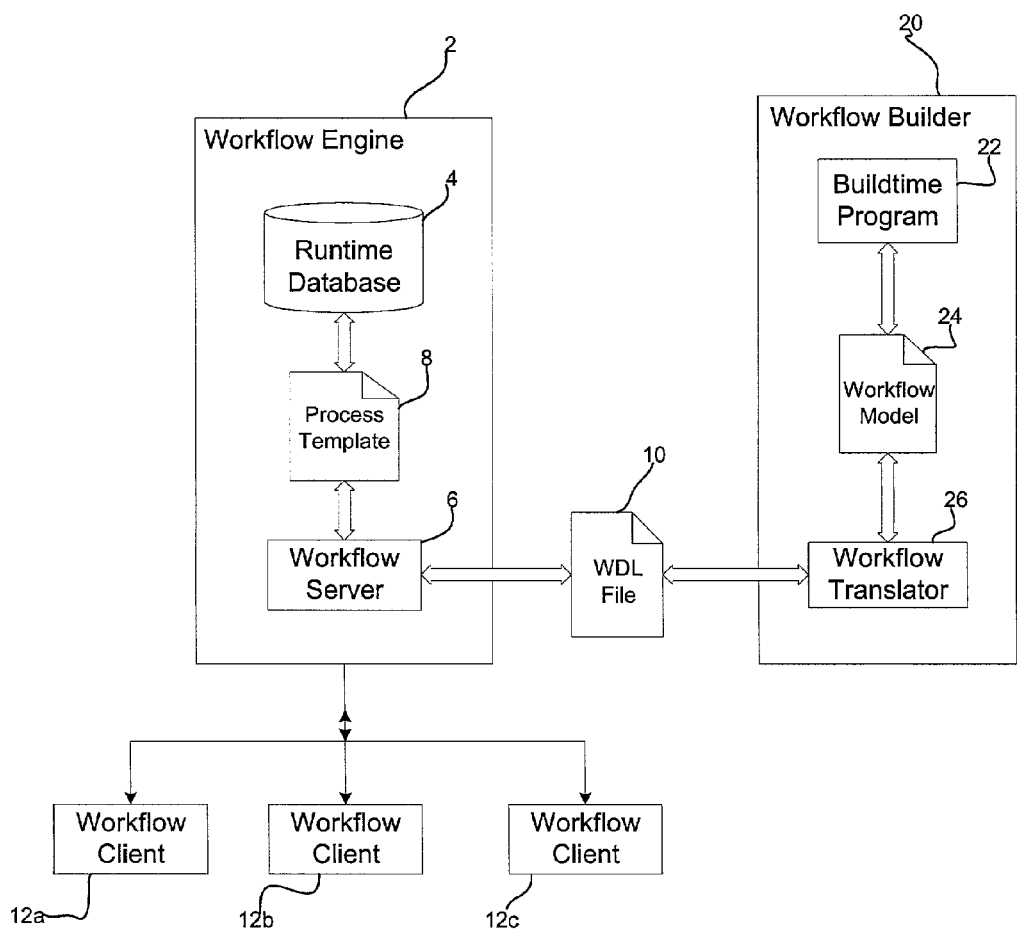
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSeries Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.**

**MQSeries, IBM, and DB2 are registered trademarks of International Business Machines Corp.; Microsoft and Microsoft SQL Server are trademarks of Microsoft Corporation; ORACLE is a trademark of the Oracle Corporation; Java is a trademark of Sun Microsystems, Inc.

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve workload balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 24 would transfer the WDL file 10 to the workflow server 6 to transform into a process template 8 in the runtime database 4 in a manner known in the art. Further details of using the buildtime program 22 to build workflows are described in the copending and commonly assigned patent application "Method, System, and Program for Generating a Workflow", having application Ser. No. 09/894,071, which application was incorporated herein by reference above.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

One use of a workflow is to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work defined therein, that work item is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

An action list may be associated with a workflow that provides a list the actions that can be invoked at the nodes in the defined workflow. The actions may comprise programs that are executed at a particular node. In certain implementations, the actions comprise Java methods that the workflow server 6 executes when control proceeds to the node with which the method is associated. Action in the list would be associated with particular nodes. An access list defines a mapping of users that can be assigned to nodes to perform the action associated with such node. A notification feature causes a message to be sent to a specified user if the user associated with a node has not performed the action defined for the node within a specified time frame.

One or more actions and a user with are associated with the work nodes in the workflow. The work nodes defined for the workflow may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 2:
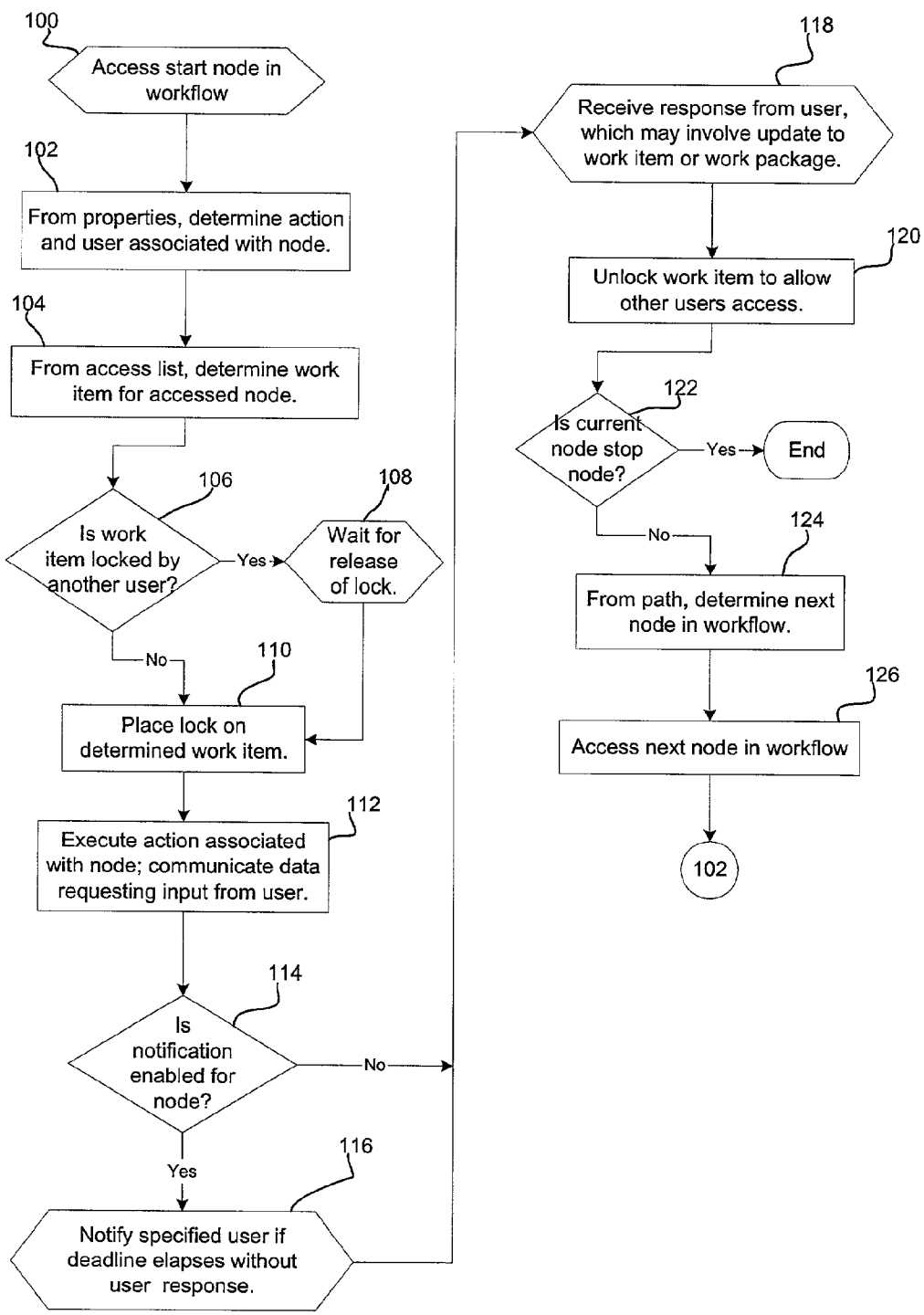
FIG. 2 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 2 illustrates the logic performed by the workflow server 6 to execute a workflow. When a user invokes a workflow stored in the runtime database 4, the workflow server 6 accesses (at block 100) the start node of the invoked workflow by interacting with the runtime database 4 in a manner known in the art. From the properties defined for that node, the workflow server 6 determines (at block 102) the actions and user associated with the node. The workflow server 6 further processes (at block 104) the access list defined for the workflow to determine the work item for the accessed node. If (at block 106) the determined work item currently accessed in the workflow is locked by another user at that node, then the workflow server 6 waits (at block 108) for the lock on the work item(s) to be released. If the work item is not locked or after the lock is released, control proceeds to block 110 where the workflow server 6 places a lock on the determined work item. The workflow server 6 then executes (at block 112) the action associated with the node and communicates data to the workflow client 12 of the determined user requesting user action.

If (at block 114) notification is enabled for the current node and the deadline has passed (at block 116) without receiving a response from the user, then the workflow server 6 notifies the user specified with the enable notification that the deadline has passed. Upon receiving (at block 118) a response from the user, which may comprise entering information, modifing a work item, adding a work item to the work package, selecting an option, etc., the workflow server 6 unlocks (at block 120) the work item(s) previously locked for the user. If (at block 122) the current node is the stop node, then control ends; otherwise, if there are further nodes to process in the workflow, then the workflow server 6 determines (at block 124) from the path from the current node the next node in the workflow and accesses (at block 126) the next node. Control then proceeds back to block 326 to process the next node.

The workflow logic of FIG. 2 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow.

With the described implementations, the workflow builder 20 generates a WDL file 10 that may be compatible with workflow engines from different vendors because different vendors may design their workflow engines to be compatible with the WDL format of the WDL file 10. This allows the workflow model defined in the WDL file 10 to be transportable across different vendor workflow engine platforms.

Object Oriented Workflow Architecture

Figure 3:
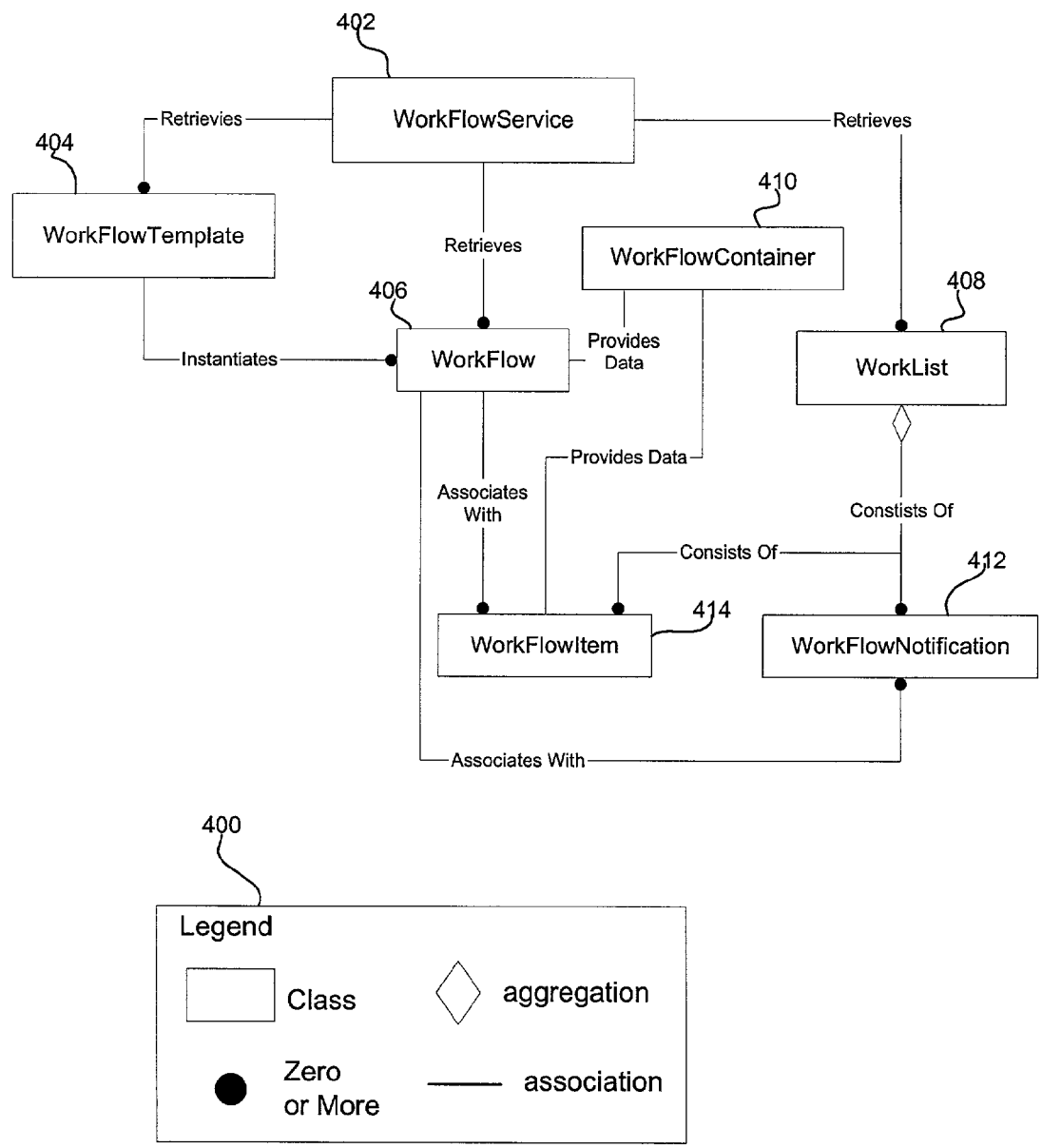
FIG. 3 illustrates an architecture of object oriented classes for implementing a workflow in accordance with implementations of the invention.

FIG. 3 illustrates an architecture of object oriented classes and their interrelationship that are used to implement a workflow of nodes. As indicated in the legend 400, a rectangle indicates a class; a line connecting classes indicates an association of the connected classes; a line connecting classes terminating in a filled circle indicates that there may be one or more instances of the class at the end with the circle for each instance of the class at the other end of the line; and a line terminating at a diamond indicates that the class at the diamond end is an aggregate, such that the aggregate object is made up of one or more instances of the class at the other end of the line. FIG. 3 illustrates the relationship of the classes.

The WorkFlowService class 402 is the starting point for a user wanting to access a workflow. The WorkFlowService class 402 includes methods that allow users to access already defined workflow templates and executing workflows. The WorkFlowService class 402 is associated with the WorkFlowTemplate 404, WorkFlow 406, and WorkFlowList 408 classes. The WorkFlowTemplate class 404 provides methods that allow the user to manipulate workflow process template objects, e.g., process template 8 (FIG. 1), which comprise a defined workflow that is stored in the workflow engine 2. The WorkFlow class 406 provides methods that allow the user to access information and control an executing workflow. The WorkList class 408 includes methods that allow the user to access an executing work list object comprised of work items and information on the current state of the executing work list, i.e., information on work items being processed. The methods in the WorkFlowService class 402 are used to retrieve information on particular workflows, workflow templates, and workflow lists associated with a particular workflow service. The methods from the other classes, such as the WorkFlowTemplate 404, WorkFlow 406, and WorkFlowList 408 classes, can then be used to obtain specific information and control over those workflow templates, workflows, and workflow lists identified by the WorkFlowService class 402 methods.

The WorkFlowTemplate class 404 provides information on a workflow template. A workflow object from the WorkFlow class 406 represents an executing workflow. The WorkFlowContainer class 410 includes methods to instantiate a container object that includes information on one container used to transfer data between nodes. Users at nodes may access data in the container and update the container with additional data. The data in the container may be used by the action being executed at a node. The WorkFlow class 406 is associated with the WorkFlowNotification class 412, which is used to provide notifications, such as notifications if a user does not perform an action at a node within a predefined time period. There may be many notifications provided for one workflow. The WorkFlow class 406 is further associated with the WorkFlowItem class 414, such that one executing workflow may be associated with one or more work items indicating a unit of work to perform for a node within the workflow. The WorkFlowItem class 414 is associated with the WorkFlowContainer class 410, such that one container may be used at a work item to provide data to the user executing the unit of work defined by the work item. The relationship between the WorkFlow class 406 and the WorkFlowItem class 414 indicates that there may be many work item objects associated with one executing workflow. The class architecture of FIG. 3 further illustrates that a workflow list of the WorkFlowList class 408 is an aggregate of the workflow from the WorkFlow 414 Item class and workflow notifications from the WorkFlowNotification 412 class.

The above object oriented architecture of FIG. 3 defines how the different classes interrelate in order to implement a workflow. Each of the above interrelated classes 402, 404, 406, 408, 410, 412, and 414 provides interfaces/methods that may be used within a workflow computer program to implement the workflow and actions performed at a node. The workflow program would be executed by the workflow server 6 (FIG. 1) in the workflow engine 2.

Following are examples of some methods of the WorkFlowService class 402, including:

WorkFlowService( ): constructs a new workflow service, which provides access to different workflow services in the workflow engine 2 (FIG. 1). Each workflow service is associated with workflow templates, executing workflows, and workflow lists of work items for a workflow.

connect: provides a user name, authentication, and connection string to use to authenticate a user to provide access to a requested workflow service, which allows access to workflow templates, work lists, etc.

connection: handle returned to a user to allow access to a particular workflow service.

setDatastore: a reference to a data store including documents and objects used by the work items in the workflows associated with the workflow service. Thus, different workflows for a workflow service may process documents within workflow packages from the same data store.

listWorkFlows: returns a list of all workflow objects of the WorkFlow class 406.

listWorkLists: returns a list of all work list objects of the WorkFlowList class 408.

listWorkFlowTemplates: returns a list of all template objects of the WorkFlowTemplate class 404.

Following are examples of some methods of the WorkFlowService class 402, including:

WorkFlowTemplate( ): constructs a workflow template object including a defined workflow. This workflow template may be created using the GUI panels and buildtime program described above.

name: returns name of a workflow template.

description: returns a description of the work performed by a workflow template.

modifiedTime: time the workflow template was last modified.

Following are examples of some methods of the WorkFlow class 406, including:

WorkFlow( ): constructs a workflow object representing a workflow comprised of nodes and work items for a specified workflow. The workflow may also be provided a container that is used to allow users of different work items to communicate and/or a work packet comprised of one or more documents or objects to be processed as part of the workflow.

get/setName: returns or sets the name for a workflow.

workFlowTemplateName: returns the name of the workflow template associated with the workflow.

notificationTime: returns the time of the last notification generated for the workflow in response to a user not performing an action for one accessed node within a specified time period.

modifiedTime: Returns the last time the workflow was modified.

stateChangeTime: returns the last time a state change occurred with the workflow:

startTime: returns the time the workflow was started.

endTime: returns the time the workflow ended.

state: returns a state of the workflow, such as ready, running, finished, terminated, suspended, terminating, suspending, deleted, etc.

inContainer: returns the input container associated with the workflow.

start: starts a workflow with a container if the state is ready.

terminate: terminates the workflow if the state is running, suspended, or suspending.

suspend: suspends the workflow if the state is running.

resume: resumes a suspended workflow if the state is suspended and suspending.

add: adds a workflow to the system that is associated with one specified workflow template.

Following are examples of methods of the WorkFlowContainer class 410, which instantiates a container object used with a workflow to transport information among the nodes.

WorkFlowContainer( ): constructs a container object for a container used within a particular workflow.

get/setPriority: get/sets the priority for an item in the container.

get/setActivityNode: get/sets the current node being processed, may also get/set information on the current activity node.

get/setWorkPacketID: get/sets an identifier of a work packet being routed through the system.

get/setActionPerformed: get/sets information on an action being performed.

get/setUserVariable: get/sets a variable maintained in the container, that may have predefined values. The priority is maintained for a user variable in the container.

retrieve: retrieves and refreshes the container.

update: updates the container data.

Following are examples of some methods of the WorkList class 408, where a work list object is a representation of a work list in the system. As discussed, a work list object comprises a collection of work items and notifications for an executing workflow.

WorkList( ): constructs a work list object for a specified work list. A work list consists of work items.

get/set ACLName: get/sets the action control list (ACL) name for the work list including the actions that may be performed as part of units of work for the work list.

listWorkItems: lists the work items on the work list.

listWorkItemsByTemplate: returns the work items for the work list by the specified workflow template name.

listWorkItemsByNode: returns a list of the work items assigned to each node in the work flow.

listProcessNotifications: lists notifications generated during workflow that are associated with the workflow process. For instance, the notification provides a general notification for the workflow. In certain implementations, a notification process is activated and performed as a background process to generate notifications.

listActivityNotifications: lists notifications generated during workflow that are associated with a particular activity, such as a user not performing an activity within a specified time. For instance, the notification may enable notifications for activities at particular nodes.

add/update/delete/retrieve: separate commands that allow user to add, update, delete, and retrieve a work list.

Additional commands may be provided to access the information in the work list, such as filter commands to provide filters for accessing information from the work list, thresholds of the number of items that can be in the work list, etc.

Following are examples of some methods of the WorkFlowItem class 414, where a work item object represents a unit of work performed in the workflow. The following methods are used to create and modify work items, and obtain information thereon.

WorkFlowItem( ): constructs a work item for a specified workflow, node, and owner.

name: returns the name of the node to which the work item is assigned.

state: returns a state of the work item, such as not set, ready, running, finished, terminated, suspended, disabled, checked out, in error, executed, etc. A work item is checked out when a user has accessed the work item to perform the actions defined for the work item.

workFlowName: returns the name of the workflow including the work item.

workFlowTemplateName: returns the name of the workflow template including the work item.

priority, owner, notificationTime, startTime, creationTime, modifiedTime: methods that return information on the priority, owner, time of last notification, time of creation and time of last modification for a work item, respectively.

retrieve start, finish: methods used to retrieve, begin executing, and complete a work item, respectively.

checkIn, checkOut: checkOut locks a work item to prevent other users at a node from accessing the work item and changes the state of the work item to checked out. Upon check out, the container associated with the work item is accessed from the previous node using the inContainer method. The checkIn method receives the completed work item from the user, releases the lock, and provides the container to route to the next node.

inContainer: method that obtains container from previous node for use with work item checked out at current node being processed.

outContainer: method generates an out container to include contents of container user accessed at work item, including any changes made by the user to the data in the container. A handle of the out container is generated and provided with checkOut method called for the next node to provide that container to the user of the next node in the workflow.

Following are examples of some methods of the WorkFlowNotification class 412, where a notification object represents a generated notification. The following methods are used to create and modify notifications, and obtain information thereon.

WorkFlowNotification( ): constructs a notification object having a specified notification name, notification type, and owner name for a specified workflow service and workflow. The notification type indicates how the owner is notified.

state: returns a state of the notification, such as not set, ready, runing, finished, terminated, suspended, disabled, etc.

priority owner, notificationTime, startTime, creationTime, modifiedTime, receivedTime: these methods return the priority of the notification, owner of the notification, time that must elapse before the notification is generated, time the notification started, time the notification was crated, time of last notification to the notification, time the notification was received, respectively. The notification would be started and executed as a background process.

receiveReason: returns a received reason for the notification.

retrieve, cancel: methods that retrieve and cancel a notification, respectively.

transfer: transfers a notification to a specified user. In this way, a notification can be transferred from the current owner to some other user.

The above described methods and classes would be included in a workflow program executed by the workflow server 6 (FIG. 1) to execute the workflow. The methods described above would be used to access and modify the workflow related objects, such as the workflow, work items, notifications, containers, etc. when running the workflow. The above described methods may also be used in other programs that can obtain information and status on a workflow.

Figure 4:
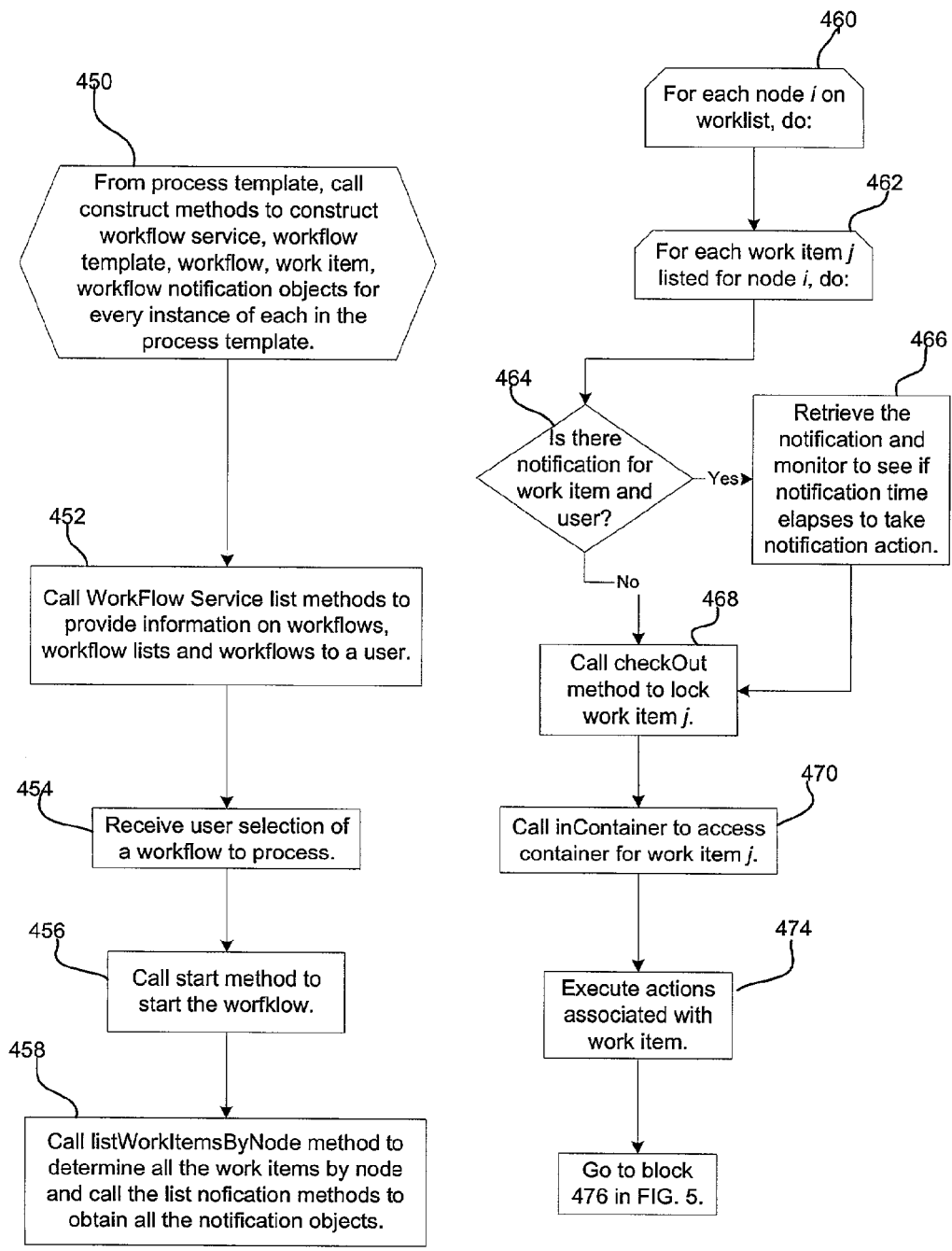
FIGS. 4 and 5 illustrate logic to utilize the methods and objects from the object oriented class architecture of FIG. 3 to execute a workflow in accordance with implementations of the invention.
Figure 5:
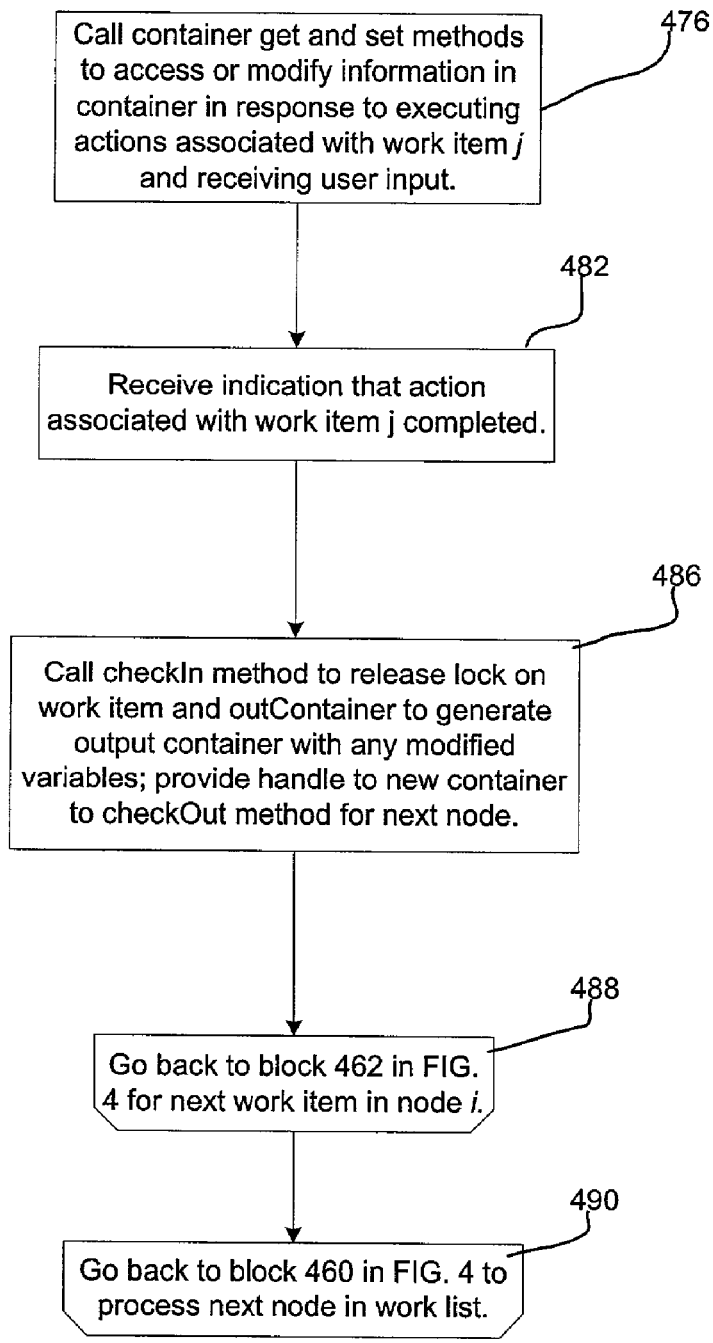

FIGS. 4–5 illustrate an example of program logic in a workflow program executed by the workflow server 6 (FIG. 1) utilizing the above discussed methods to implement a workflow. With respect to FIG. 4, control begins at block 450 where the program calls the constructor methods, WorkFlowService( ) to construct a workflow service object. The workflow program would then call (at block 452) the WorkFlowService list methods, such as listWorkFlows, listWorkLists, listWorkFlowTemplates, to obtain information on the workflows, workflow templates, and work lists for a workflow service. This information may then be presented to a user for selection. Various other methods in the classes may be called to access information on the workflow to present to the user when making a decision on which workflow to execute.

At block 454, user selection of a workflow to process is received. The workflow program then calls (at block 456) the WorkFlow start method to start the workflow. The workflow program then calls (at block 458) the listWorkItemsByNode method to obtain all the work items for the started workflow, and the nodes to which the one or more items are associated. The workflow program then performs a loop at blocks 460 through 490 for each node i in the workflow, as determined from the list of work items by node. For each node i, the workflow program performs a loop at block 462 to 488 for each work item j associated with node i. If (at block 464) there is a notification for the work item and the user that is the owner of the item, as determined from the methods, then the workflow program retrieves (at block 466) retrieves the notification and then starts a monitor to determine if the time period for the notification has elapsed without the work item completing. From block 464 or 466, the workflow program calls (at block 468) the checkOut method to lock the work item j. The inContainer method is called (at block 470) to access any container associated with the work item j. Once the work item j is locked, the workflow program then executes (at block 474) the actions associated with the work item j.

Control then proceeds to block 476 in FIG. 5, where the workflow program calls container get and set methods to access or modify the data and variables in the container accessed for the work item j in response to executing actions assigned to that work item j. For instance, as part of performing actions for a work item, the user of the work item may read and write data to the container. The workflow program receives (at block 482) indication from a user that the actions associated with the work item have completed. The workflow program further calls (at block 486) the checkin method to release the lock on the work item j and the outContainer method to generate a new container including any updates to provide to the user at the next node in the workflow. The handle to the new container would be used in the next called checkOut method to provide the container to the user at the next node of the workflow. If there are further work items for the node i, then control proceeds (at block 488) back to block 452 to retrieve the next work item. After completing all the work items for node i, control proceeds (at block 490) back to block 460 to process the next node in the work list.

The above described logic utilized workflow related classes and the methods therein to implement a workflow and obtain information thereon. The workflow server 6, or some other component in the workflow engine 2 (FIG. 1), would then translate the workflow objects and methods into application specific commands, such as Structured Query Language (SQL) commands to manipulate the data in the runtime database 4 and process template 8 to obtain information on the workflow and implement workflow operations.

Using Database Stored Procedures in the Workflow Design

Figure 6:
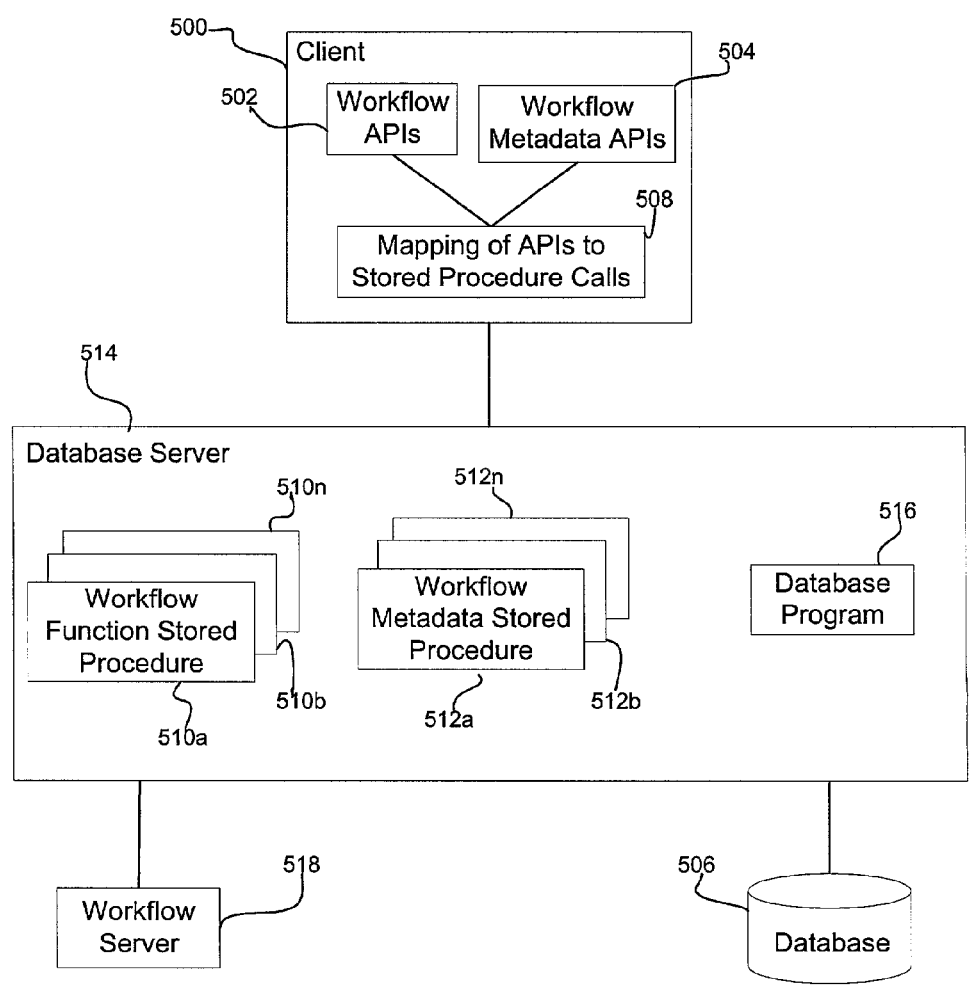
FIG. 6 illustrates an architecture of a workflow computing environment in accordance with implementations of the invention.

FIG. 6 illustrates a workflow architecture including a client 500, such as the workflow clients 12a, b . . . n described with respect to FIG. 1. The client 500 is capable of invoking, in response to user input or executing an application program, one or more workflow application programming interfaces (APIs) 502 to perform workflow related operations and workflow metadata APIs 504 to access, update or modify workflow related information maintained in a database 506. The workflow APIs 502 may implement the object oriented workflow classes described above, such as those described with respect to FIG. 3. In certain implementations, the workflow APIs 502 and 504 may be implemented in a commonly used object oriented programming language, such as Java.

The client 500 further includes a mapping 508 of the APIs 502 and 504 to stored procedure calls that invoke stored procedures 510a, b . . . n, 512a, b . . . n on a database server 514. Thus, for each API 502 and 504, there are one or more stored procedure calls to invoke one or more stored procedures 510a, b . . . n, 512a, b . . . n on the database server 514 to perform the action specified by the API command. The client stored procedure call corresponding to the called API provides input parameters to the stored procedure 510a, b . . . n, 512a, b . . . n. In response to the call, the stored procedures 510a, b . . . n, 512a, b . . . n execute within the database server 514 and may processes numerous database records in the database 506 according to the input parameters or perform a non-SQL related action, such as transmitting native workflow code to the workflow server 518 to execute. In certain stored procedure implementations, the client cannot interrupt the stored procedures during execution. The stored procedures 510a, b . . . n, 512a, b . . . n may comprise a block of procedural constructs and may include Structured Query Language (SQL) statements, i.e., an application program. Stored procedures are maintained at the database server 514 for access and reuse by multiple clients 500. Further details of stored procedures are described in the publication "A Complete Guide to DB2 Universal Database," "A Complete Guide to DB2 Universal Database," which was incorporated by reference above.

The database server 512 includes a database program 516 to perform database operations, such as execute stored procedure calls and execute SQL statements to access data in the database 506. The workflow function stored procedures 510a, b . . . n include the workflow engine native code, e.g., C, C++, etc., capable of causing a workflow server 518, such as the workflow server 6 described with respect to FIG. 1, to perform the workflow function specified by the corresponding workflow API 502. The workflow metadata stored procedures 512a, b . . . n include SQL statements to access data in the database 506 and perform database operations on such data.

The client 500 executing the workflow APIs 502 and 504 may comprise a separate client machine that communicates with the database server 514 over a network or other connection (not shown), or comprise a program executing on the database server 514. The database server 514 comprises a separate server class machine for maintaining the stored procedures 510a, b . . . n and 512a, b . . . n and database program 516 that controls access to the database 506. The database program 516 may comprise any database client/server program known in the art, such as IBM DB2, Oracle Corporation's ORACLE 8, Microsoft SQL Server, ** etc.

**MQSeries, IBM, and DB2 are registered trademarks of International Business Machines Corp.; Microsoft and Microsoft SQL Server are trademarks of Microsoft Corporation; ORACLE is a trademark of the Oracle Corporation; Java is a trademark of Sun Microsystems, Inc.

In Java implementations, the mapping 508 may comprise Java Database Connectivity (JDBC) CallableStatements, where each CallableStatement assigns a stored procedure call in the native SQL of the database program 518 to an escape syntax, which may comprise the workflow APIs 502, 504. Thus, for each API, one separate JDBC CallableStatement would define a stored procedure to call to implement the workflow related operation associated with the API.

Figure 7:
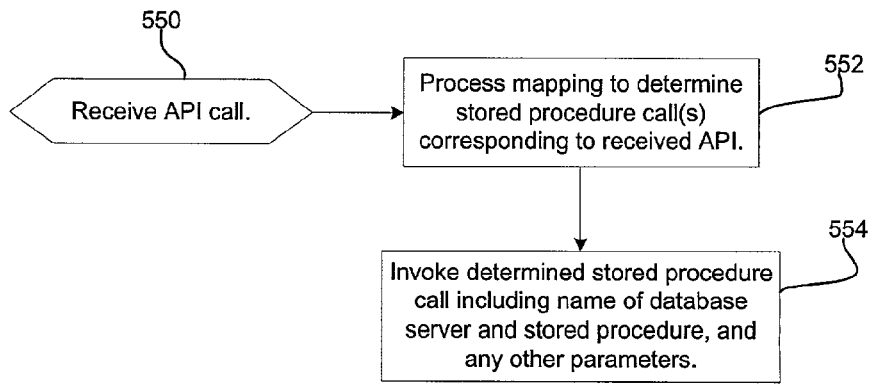
FIGS. 7 and 8 illustrate logic implemented in the architecture of FIG. 6 to perform workflow related operations in accordance with implementations of the invention.

FIG. 7 illustrates logic implemented in the workflow APIs 502 and 504 in the client 500 to implement the client 500 invoked API. Upon receiving (at block 550) an API call 502, 504, the mapping 508 is processed (at block 552) to determine one or more stored procedure calls corresponding to the received API. The client 500 then invokes (at block 554) the determined stored procedure call(s), including the name of the called stored procedure and the database server 514 including the called stored procedure, and transfers the call to the database server 514. In the described implementations, the client 500 generates a stored procedure CALL statement specifying the name of the server stored procedure 510a, b . . . n, 512a, b . . . n and the parameters received as input by the stored procedure 510a, b . . . n, 512a, b . . . n.

The mapping 508 may associate multiple stored procedure calls with one API call, such that invocation of the API call invokes the associated multiple stored procedures.

Figure 8:
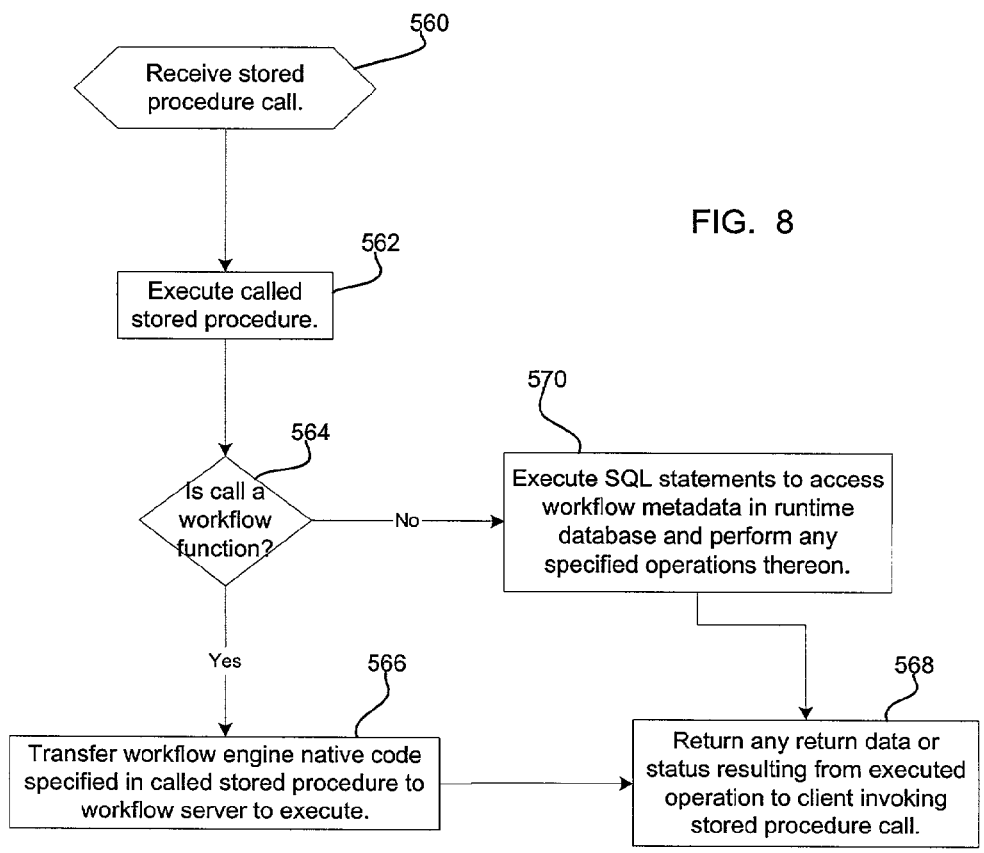

FIG. 8 illustrates logic implemented in the database program 516 to process the stored procedure calls from the client 500. In response to receiving (at block 560) the stored procedure call, communicates from the client 500 to the database server 514, the database program 516 executes (at block 562) the called stored procedure 5 10a, b . . . n, 512a, b . . . n. If (at block 564) the received API is a workflow API 502, then the corresponding called stored procedure 510a, b . . . n includes the workflow server 518 native code. This stored procedure 510a, b . . . n would then instruct the database program 516 to transfer (at block 566) the native code included in the called stored procedure to the workflow server 518 to execute and perform the function defined by the API 502. With the workflow function stored procedures 510a, b . . . n the workflow server 518 native code is wrapped in the stored procedure. Otherwise, if the stored procedure is a workflow metadata stored procedure 512a, b . . . n including SQL statements, then the database program 516 would execute (at block 570) such SQL statements to access workflow metadata in the database 506 and perform any specified SQL operations thereon. After the executed stored procedure completes all processing, status or result data may be returned to the client 502.

There are numerous ways the stored procedures may be used to access and update workflow metadata in the database 506 and then invoke workflow operations on the workflow server 6. For instance, during workflow runtime, the client 500 may call workflow metadata APIs 504 to access workflow related information, such as worklists, access control lists, etc., and then subsequently call a workflow API 502 that specifies a workflow function to perform in the workflow server 518 on the metadata accessed from the database 506. Alternatively, a stored procedure 510a, b . . . n or 512a, b . . . n may include SQL statements to access data from the database 506 and then transfer such accessed metadata along with native code to the workflow server 518 to execute. For instance, the workflow function stored procedure 510a, b . . . n may access worklists, access control lists, etc., from the database 506 and then pass such data along with native code to the workflow server 6 to process during workflow operations. Still further, one stored procedure 510a, b, . . . n, 512a, b . . . n may access workflow metadata from the database 506 and then call and directly pass such accessed workflow metadata to a workflow function stored procedure 510a, b . . . n to pass to the workflow server 518 to process.

Still further, a stored procedure may pass native code to the workflow server 518 to execute and receive return workflow metadata from the workflow server 518 to apply to the database 506. The same or another stored procedure on the database server 514 may then use SQL statements to update the database 506 with the returned workflow metadata. Alternatively, the returned workflow metadata may be passed back to the client 500, and the client 500 may further call workflow metadata APIs 504 to invoke a workflow metadata stored procedure 512a, b . . . n to update the database 506 with the returned workflow metadata from the workflow server 518.

Thus, any workflow related operation comprising a combination of calls to the workflow server 518 and accesses of workflow metadata in the database 506 may be combined into one stored procedure in the database server 514 or distributed across multiple stored procedures.

Moreover, in certain implementations, one workflow API 502 may map to multiple stored procedure calls. For instance, one stored procedure call authenticates the user and provides a connection to the workflow server 518 and runtime database 516, one other stored procedure performs the requested workflow related action, and yet a further stored procedure disconnects the authenticated user.

The described implementations transform client API calls to stored procedure calls that are executed on a separate database server to perform the function specified by the API call with respect to the workflow server 8 and/or the database 506.

In implementations where multiple vendors provide workflow engines for use in a federated system, each vendor may use the same API calls, but provide a different set of stored procedure code to implement the action specified with the API to accommodate the differences in the vendor's workflow server and database structure. Thus, the workflow APIs 502, 504 remain the same across vendor implementations, whereas each vendor provides the specific stored procedure programs 510a, b . . . n and 512a, b . . . n to perform the action associated with the APIs on the vendor specific workflow server 518 and database 506.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The workflow client and server may be implemented within any vendor workflow program known in the art.

In the described implementations, the actions were implemented as Java methods. Alternatively, the actions may be implemented in any programming language known in the art.

In the described implementations, the class architecture is implemented as an object oriented class architecture. Alternatively, non-object oriented programming techniques may be used to implement the described class architecture.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing workflow related operations, comprising:

receiving an application programming interface (API) call to perform a workflow related operation;

determining at least one stored procedure call associated with the received API call; and calling the determined at least one stored procedure call, wherein each stored procedure call causes the execution of one determined stored procedure on a database server to perform the workflow related operation of an API of the received API call;

wherein the received API call comprises a first call to a first stored procedure associated with a first API call, wherein the first stored procedure includes native workflow server code, wherein executing the first stored procedure comprises communicating the native workflow server code to a workflow server to perform the workflow related operation associated with a first API of the first API call, wherein the workflow server returns workflow metadata, further comprising:

receiving a second stored procedure call associated with a second API call that invokes a second stored procedure on the database server, wherein the second stored procedure includes database statements; and executing the second stored procedure to cause a database program to execute the database statements to update a workflow database with the returned workflow metadata.

2. The method of claim 1, wherein at least one stored procedure call invokes one stored procedure in the database server that includes native workflow server code to communicate to a workflow server to execute to perform the workflow related operation of the API and wherein at least one stored procedure call invokes one stored procedure in the database server that includes database statements executed by a database program to access workflow related metadata for the API.

3. The method of claim 1, wherein the workflow related operation for at least one API is to be performed on a workflow server and wherein the workflow related operation for at least one API is to access workflow metadata from a workflow database.

4. The method of claim 1, wherein the workflow related operation comprises a function to perform on a workflow server, wherein the database server includes a database program that executes one determined stored procedure to perform:

communicating native workflow server code included in the executed stored procedure to the workflow server, wherein the workflow server executes the native workflow server code to perform the workflow related operation of the API.

5. The method of claim 4, wherein the API and native workflow server code are in different programming languages.

6. The method of claim 1, wherein the workflow related operation concerns accessing workflow metadata in a workflow database, wherein the database server includes a database program that executes one determined stored procedure to perform:

executing database statements included in the executed stored procedure to access workflow metadata in the workflow database.

7. The method claim 3, wherein the database statements comprise Structured Query Language (SQL) statements.

8. A method for performing workflow related operations at a database server in communication with a client, comprising:

receiving at least one call to one stored procedure at the database server associated with an application programming interface (API) call invoked from the client to perform a workflow related operation; and executing, at the database server, the at least one called stored procedure to perform the workflow related operation of an API of the API call;

wherein the received at least one call to one stored procedure comprises a first call to a first stored procedure associated with a first API call, wherein the first stored procedure includes native workflow server code, wherein executing the first stored procedure comprises communicating the native workflow server code to a workflow server to perform the workflow related operation associated with a first API of the first API call, wherein the workflow server returns workflow metadata, further comprising:

receiving a second stored procedure call associated with a second API call that invokes a second stored procedure on the database server, wherein the second stored procedure includes database statements; and executing the second stored procedure to cause a database program to execute the database statements to update a workflow database with the returned workflow metadata.

9. The method of claim 8, wherein the received at least one call to one stored procedure comprises third and fourth stored procedure calls to third and fourth stored procedures, respectively, on the database server to implement the workflow related operation of the API.

10. The method of claim 9, wherein executing the third stored procedure comprises authenticating the client and establishing a connection and wherein executing the fourth stored procedure comprises performing the workflow related operation of the API.

11. The method of claim 9, wherein executing the third stored procedure comprises accessing workflow metadata from a workflow database and wherein executing the fourth stored procedure comprises communicating native workflow server code and the accessed workflow metadata to a workflow server, wherein the workflow server processes the communicated native workflow server code and the workflow metadata to perform the workflow related operation of the API.

12. The method of claim 9, wherein executing the third stored procedure comprises communicating native workflow server code to a workflow server, wherein the workflow server processes the communicated native workflow server code to perform the workflow related operation of the API and returns workflow metadata, and wherein executing the fourth stored procedure call for the API comprises updating a workflow database with the workflow metadata returned by the workflow server.

13. The method of claim 8, wherein the received at least one call to the stored procedure comprises a third call to a third stored procedure associated with a third API call, wherein the third stored procedure includes database statements, wherein executing the third stored procedure comprises communicating the database statements to a database program to access workflow metadata from a workflow database, further comprising:

receiving a fourth stored procedure call associated with a fourth API call that invokes a fourth stored procedure on the database server, wherein the fourth stored procedure includes native workflow server code; and executing the fourth stored procedure to communicate the native workflow server code and the accessed workflow metadata included therein to a workflow server to perform the workflow related operation associated with a fourth API of the fourth API call.

14. The method of claim 13, wherein the third stored procedure returns the accessed workflow metadata to the client, and wherein the fourth stored procedure call from the client passes the accessed workflow metadata to the fourth stored procedure to communicate to the workflow server with the native workflow server code.

15. The method of claim 14, wherein the third stored procedure returns the returned workflow metadata from the workflow server to the client, and wherein the fourth stored procedure call from the client passes the returned workflow metadata from the workflow server to the fourth stored procedure to call the database program to update the workflow database with the returned workflow metadata.

16. A system for performing workflow related operations, comprising:

a database server;

a tangible computer readable medium including a plurality of stored procedures, wherein each stored procedure is associated with at least one application programming interface (API) call defined to perform a workflow related operation, wherein the computer readable medium is accessible to the database server;

a workflow server coupled to the database server;

means for receiving one API call to perform one workflow related operation;

means for determining at least one stored procedure call associated with the received API call;

means for calling the determined at least one stored procedure call; and means, performed by the database server, for executing at least one stored procedure in response to the determined at least one stored procedure call being called to perform the workflow related operation of an API of the API call;

wherein the received API call comprises a first call to a first stored procedure associated with a first API call, wherein the first stored procedure includes native workflow server code, wherein executing the first stored procedure comprises communicating the native workflow server code to the workflow server to perform the workflow related operation associated with a first API of the first API call, wherein the workflow server returns workflow metadata, further comprising:

means for receiving a second stored procedure call associated with a second API call that invokes a second stored procedure on the database server, wherein the second stored procedure includes database statements; and means for executing the second stored procedure to cause a database program to execute the database statements to update a workflow database with the returned workflow metadata.

17. The system of claim 16, wherein at least one stored procedure call invokes one stored procedure that includes native workflow server code to perform the workflow related operation of the API, and wherein at least one stored procedure call invokes one stored procedure that includes database statements to access workflow related metadata for the API, further comprising:

a database;

means, performed by the workflow server, for receiving native workflow server code from one stored procedure;

means, performed by the workflow server, for executing the received native workflow server code to perform the workflow related operation; and means for executing database statements from one stored procedure to access workflow related metadata for the API from the database.

18. The system of claim 16, wherein the workflow related operation for at least one API is to be performed on a workflow server and wherein the workflow related operation for at least one API is to access workflow metadata from a workflow database.

19. The system of claim 16, further comprising:
a workflow server, wherein the workflow related operation comprises a function to perform on the workflow server;
means, performed at the database server, for executing one determined stored procedure to communicate native workflow server code included in the executed stored procedure to the workflow server; and
means, performed by the workflow server, for executing the native workflow server code to perform the workflow related operation of the API.

20. The system of claim 19, wherein the API and native workflow server code are in different programming languages.

21. The system of claim 16, further comprising:
a workflow database, wherein the workflow related operation concerns accessing workflow metadata in the workflow database; and
means, performed at the database server, for executing the database statements in the determined stored procedure to access workflow metadata in the workflow database.

22. The system claim 17, wherein the database statements comprise Structured Query Language (SQL) statements.

23. A system for performing workflow related operations, comprising:
a database server;
a client in communication with the database server;
means, performed by the client, for executing an application programming interface (API) call to perform a workflow related operation, wherein at least one stored procedure call at the database server is associated with the executed API call;
means, performed by the client, for communicating the at least one stored procedure call to at least one stored procedure associated with the executed API call to the database server; and
means, performed by the database server, for executing the at least one called stored procedure to perform the workflow related operation of an API of the API call;
wherein the at least one stored procedure call comprises a first and second stored procedure calls to first and second stored procedures, respectively, on the database server to implement the workflow related operation of the API and further comprising:
a workflow database, wherein the means for executing the at least one called stored procedure at the database server executes the first stored procedure to access workflow metadata from the workflow database;
a workflow server, wherein the means for executing the at least one called stored procedure at the database server executes the second stored procedure at the database server to communicate native workflow server code and the accessed workflow metadata to the workflow server; and
means performed by the workflow server for processing the communicated native workflow server code and the workflow metadata to perform the workflow related operation of the API.

24. The system of claim 23, wherein the means for executing the at least one called stored procedure performs executing a third stored procedure to authenticate the client and establish a connection and wherein executing a fourth stored procedure call comprises performing the workflow related operation of the API.

25. The system of claim 23, further comprising:
wherein the means for executing the at least one called stored procedure at the database server executes a third stored procedure to communicate native workflow server code to the workflow server;
means, performed by the workflow server, for processing the communicated native workflow server code to perform the workflow related operation of the API and returning workflow metadata; and
wherein the means for executing the at least one called stored procedure executes a fourth stored procedure call for the API updates the workflow database with the workflow metadata returned by the workflow server.

26. The system of claim 23, wherein a third stored procedure is associated with a third API call and includes database statements, further comprising:
the workflow database in communication with the database server;
means, performed by the database server, for accessing access workflow metadata from the workflow database in response to executing the third stored procedure;
means, performed by the database server, for receiving a fourth stored procedure call associated with a second API call;
wherein the means, performed by the database server, for executing the at least one stored procedure performs:
(i) executing the fourth stored procedure including native workflow server code; and
(ii) executing the fourth stored procedure to communicate the native workflow server code and the accessed workflow metadata included therein to the workflow server; and
means, performed by the workflow server, for executing the native workflow server code communicated from the database server to process the workflow metadata received from the database server to perform the workflow related operation associated with a fourth API of the fourth API call.

27. The system of claim 26, wherein the means for executing the at least one stored procedure further performs executing the third stored procedure to return the accessed workflow metadata to the client; and
means, performed by the client, for passing the accessed workflow metadata received from the database server with the fourth stored procedure call to the database server to communicate to the workflow server with the native workflow server code.

28. The system of claim 23, wherein the received call to the stored procedure comprises a third call to a first stored procedure associated with a third API call, wherein the third stored procedure includes native workflow server code, further comprising:
wherein the means for executing the at least one stored procedure performs executing the third stored procedure to communicate the native workflow server code in the third stored procedure to the workflow server to process and perform the workflow related operation associated with a third API of the third API call;
means for returning, performed by the workflow server, workflow metadata, wherein the means for executing the at least one stored procedure further performs receiving a fourth stored procedure call associated with a fourth API call that invokes the fourth stored procedure on the database server, wherein the fourth stored procedure includes database statements; and executing, at the database server, the database statements in the fourth stored procedure to update the workflow database with the returned workflow metadata.

29. The system of claim 23, wherein a third stored procedure returns the returned workflow metadata from the workflow server to the client, and wherein the fourth stored procedure call from the client passes the returned workflow metadata from the workflow server to the fourth stored procedure to call the database program to update the workflow database with the returned workflow metadata.

30. An article of manufacture including code for performing workflow related operations by:

receiving an application programming interface (API) call to perform a workflow related operation;

determining at least one stored procedure call associated with the received API call; and calling the determined at least one stored procedure call, wherein each stored procedure call causes the execution of one determined stored procedure on a database server to perform the workflow related operation of an API of the API call;

wherein the received at least one stored procedure call comprises a first and second stored procedure calls to first and second stored procedures, respectively, on the database server to implement the workflow related operation of the API and further comprising:

executing the at least one called stored procedure at the database server executes the first stored procedure to access workflow metadata from a workflow database;

executing the at least one called stored procedure at the database server executes the second stored procedure at the database server to communicate native workflow server code and the accessed workflow metadata to a workflow server; and processing the communicated native workflow server code and the workflow metadata to perform the workflow related operation of the API at the workflow server.

31. The article of manufacture of claim 30, wherein at least one stored procedure call invokes one stored procedure in the database server that includes native workflow server code to communicate to a workflow server to execute to perform the workflow related operation of the API and wherein at least one stored procedure call invokes one stored procedure in the database server that includes database statements executed by a database program to access workflow related metadata for the API.

32. The article of manufacture of claim 30, wherein the workflow related operation for at least one API is to be performed on a workflow server and wherein the workflow related operation for at least one API is to access workflow metadata from a workflow database.

33. The article of manufacture of claim 30, wherein the workflow related operation comprises a function to perform on a workflow server, wherein the database server includes a database program that executes one determined stored procedure to perform:

communicating native workflow server code included in the executed stored procedure to the workflow server, wherein the workflow server executes the native workflow server code to perform the workflow related operation of the API.

34. The article of manufacture of claim 33, wherein the API and native workflow server code are in different programming languages.

35. The article of manufacture of claim 30, wherein the workflow related operation concerns accessing workflow metadata in a workflow database, wherein the database server includes a database program that executes one determined stored procedure to perform:

executing database statements included in the executed stored procedure to access workflow metadata in the workflow database.

36. The article of manufacture of claim 34, wherein the database statements comprise Structured Query Language (SQL) statements.

37. An article of manufacture including code for performing workflow related operations at a database server in communication with a client by:

receiving at least one call to one stored procedure at the database server associated with an application programming interface (API) call invoked from the client to perform a workflow related operation; and executing, at the database server, the at least one called stored procedure to perform the workflow related operation of an API of the API call;

wherein the at least one received call to the stored procedure comprises a first call to a first stored procedure associated with a first API call, wherein the first stored procedure includes native workflow server code, wherein executing the first stored procedure comprises communicating the native workflow server code to a workflow server to perform the workflow related operation associated with a first API of the first API call, wherein the workflow server returns workflow metadata, further comprising:

receiving a second stored procedure call associated with a second API call that invokes a second stored procedure on the database server, wherein the second stored procedure includes database statements;

executing the second stored procedure to cause a database program to execute the database statements to update a workflow database with the returned workflow metadata.

38. The article of manufacture of claim 37, wherein the received at least one call to one stored procedure comprises a third and fourth stored procedure calls to third and fourth stored procedures, respectively, on the database server to implement the workflow related operation of the API.

39. The article of manufacture of claim 38, wherein executing the third stored procedure comprises authenticating the client and establishing a connection and wherein executing the fourth received stored procedure call comprises performing the workflow related operation of the API.

40. The article of manufacture of claim 38, wherein executing the third stored procedure comprises accessing workflow metadata from a workflow database and wherein executing the fourth stored procedure comprises communicating native workflow server code and the accessed workflow metadata to a workflow server, wherein the workflow server processes the communicated native workflow server code and the workflow metadata to perform the workflow related operation of the API.

41. The article of manufacture of claim 38, wherein executing the third stored procedure comprises communicating native workflow server code to a workflow server, wherein the workflow server processes the communicated native workflow server code to perform the workflow related operation of the API and returns workflow metadata, and wherein executing the fourth stored procedure call for the API comprises updates a workflow database with the workflow metadata returned by the workflow server.

42. The article of manufacture of claim 37, wherein the at least one received call to the stored procedure comprises a third call to a third stored procedure associated with a third API call, wherein the third stored procedure includes database statements, wherein executing the third stored procedure comprises communicating the database statements to a database program to access workflow metadata from a workflow database, further comprising:

receiving a fourth stored procedure call associated with a fourth API call that invokes a fourth stored procedure on the database server, wherein the fourth stored procedure includes native workflow server code; and executing the fourth stored procedure to communicate the native workflow server code and the accessed workflow metadata included therein to a workflow server to perform the workflow related operation associated with a fourth API of the fourth API call.

43. The article of manufacture of claim 42, wherein the third stored procedure returns the accessed workflow metadata to the client, and wherein the fourth stored procedure call from the client passes the accessed workflow metadata to the fourth stored procedure to communicate to the workflow server with the native workflow server code.

44. The article of manufacture of claim 37, wherein the third stored procedure returns the returned workflow metadata from the workflow server to the client, and wherein the fourth stored procedure call from the client passes the returned workflow metadata from the workflow server to the fourth stored procedure to call the database program to update the workflow database with the returned workflow metadata.

* * * * *